(12) United States Patent
Sasaki

(10) Patent No.: US 7,281,445 B2
(45) Date of Patent: Oct. 16, 2007

(54) GEAR SPEED REDUCER

(75) Inventor: Hideki Sasaki, Sendai (JP)

(73) Assignee: Keihin Corporation, Tokyo (JP)

( * ) Notice: Subject to any disclaimer, the term of this patent is extended or adjusted under 35 U.S.C. 154(b) by 0 days.

(21) Appl. No.: 11/240,328

(22) Filed: Sep. 30, 2005

(65) Prior Publication Data

US 2006/0070604 A1 Apr. 6, 2006

(30) Foreign Application Priority Data

Sep. 30, 2004 (JP) .............................. 2004-288233

(51) Int. Cl.
*F16H 55/08* (2006.01)
*F16K 31/02* (2006.01)

(52) U.S. Cl. .................. 74/412 R; 185/37; 251/129.12

(58) Field of Classification Search ............... 74/412 R, 74/89.42, 6, 7; 123/337, 361, 396, 397, 398, 123/399, 400, 403; 185/37; 475/149, 150, 475/153; 251/129.12, 129.13; 192/139, 192/148

See application file for complete search history.

(56) References Cited

U.S. PATENT DOCUMENTS

| | | | | |
|---|---|---|---|---|
| 4,762,025 A | * | 8/1988 | Lew ............................ | 475/175 |
| 4,896,567 A | * | 1/1990 | Zhou ........................... | 475/170 |
| 5,022,369 A | * | 6/1991 | Terazawa ..................... | 123/399 |
| 5,168,951 A | * | 12/1992 | Sugiura et al. ............. | 180/197 |
| 6,640,776 B2 | * | 11/2003 | Torii ........................... | 123/396 |
| 2003/0196640 A1 | * | 10/2003 | Saito et al. ................. | 123/399 |

FOREIGN PATENT DOCUMENTS

| | | |
|---|---|---|
| JP | 2001-041293 | 2/2001 |
| JP | 2001-355685 | 12/2001 |
| JP | 2002-256894 | 9/2002 |
| JP | 2003-074645 | 3/2003 |
| JP | 2003-172407 | 6/2003 |
| JP | 2003-206762 | 7/2003 |
| JP | 2004-36629 | 2/2004 |
| JP | 2004-185824 | 7/2004 |

OTHER PUBLICATIONS

Japanese Office Action for Application No. 2004-288233, dated Jul. 24, 2007.

* cited by examiner

*Primary Examiner*—Thomas R. Hannon
*Assistant Examiner*—James Pilkington
(74) *Attorney, Agent, or Firm*—Lahive & Cockfield, LLP; Anthony A. Laurentano, Esq.

(57) ABSTRACT

When a rotational shaft of a gear speed reducer is rotated, a small-diameter gear of a first gear is held in mesh with first internal teeth of a fixed gear and a large-diameter gear of the first gear is held in mesh with second internal teeth of a second gear. The first gear and the second gear comprise cycloidal gears, respectively, and transmit rotational drive power to the second gear. The rotational drive power is output from an output shaft of the second gear. The gear speed reducer has a default mechanism for holding the output shaft at a predetermined angular position when an electric signal applied to an actuator is interrupted, and a self-lock function for preventing drive power applied from the output shaft from being transmitted to the actuator.

8 Claims, 6 Drawing Sheets

GEAR SPEED REDUCER

RELATED APPLICATION

This application is a related to, and claims priority to Japanese Patent Application Number 2004-288233, filed on Sep. 30, 2004. This application also claims the benefit of said Applications for all subject matter in common with this application. The disclosure of said Applications is hereby incorporated by reference in its entirety.

BACKGROUND OF THE INVENTION

1. Field of the Invention

The present invention relates to a gear speed reducer for reducing the rotational speed of an actuator that is energized by an electric signal and outputting the reduced rotation.

2. Description of the Related Art

There have heretofore been employed in the art gear speed reducers for reducing the rotational speed of an actuator that is energized by an electric signal of a motor or the like, and transmitting the reduced rotation to an output member.

For example, such a gear speed reducer is combined with a throttle valve. The rotational output power from an electric motor is transmitted through a drive gear comprising a spur gear to an intermediate gear. After the rotation of the drive gear is reduced in speed by the mesh between the drive gear and the intermediate gear, the rotation is transmitted through a driven gear held in mesh with the intermediate gear to the valve shaft of the throttle valve. The rotational output power from the electric motor is reduced and transmitted through the drive gear, the intermediate gear, and the driven gear to the valve shaft, thereby rotating the valve shaft. For details, reference should be made to Japanese Laid-Open Patent Publication No. 2003-206762, for example.

There is also known in the art a worm gear speed reducer which employs a worm gear for reducing and transmitting rotational output power from an actuator such as an electric motor therethrough to an output shaft. The worm gear speed reducer has a worm mounted on the motor shaft of the electric motor and a helical gear supported on a shaft that extends substantially perpendicularly to the motor shaft and held in mesh with the worm. The drive torque from the electric motor is transmitted from the motor shaft to the worm and then from the worm to the helical gear, and the reduced drive toque is output to the output shaft. For details, reference should be made to Japanese Laid-Open Patent Publication No. 2003-172407, for example.

The speed reducer disclosed in Japanese Laid-Open Patent Publication No. 2003-206762 employs spur gears as the drive gear for transmitting the output of the electric motor, the intermediate gear held in mesh with the drive gear, and the driven gear held in mesh with the intermediate gear for transmitting the rotation to the valve shaft. If the rotational output power from the electric motor is to be output to the output shaft with largely reduced speed, then it is necessary to increase the number of gear teeth of the gears. However, an increase in the number of gear teeth of a spur gear results in an increase in the diameter of the spur gear. Furthermore, since the drive gear, the intermediate gear, and the driven gear are supported respectively on support shafts extending substantially parallel to each other, the speed reducer including these gears tends to become larger in size.

The worm speed reducer disclosed in Japanese Laid-Open Patent Publication No. 2003-172407 employs the worm gear which comprises the worm and the helical gear as a speed reducer mechanism. As the worm gear has poor rotation transmitting efficiency, it is difficult to transmit the rotational output power from the electric motor efficiently to the output shaft. In addition, the worm gear is low in durability.

The motor shaft on which the worm is mounted and the output shaft of the helical gear that is held in mesh with the worm extend substantially perpendicularly to each other. Therefore, the worm speed reducer is large in size because of the space required therein for housing the motor shaft and the output shaft, and a large installation space is needed for installing the worm speed reducer.

SUMMARY OF THE INVENTION

It is a general object of the present invention to provide a gear speed reducer which can transmit the rotational drive power from an actuator efficiently to an output shaft, can keep the output shaft angularly displaced to a position between an initial position and a terminal position when the supply of an electric signal to the actuator is stopped, and is reduced in size and highly durable.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Figure 1:
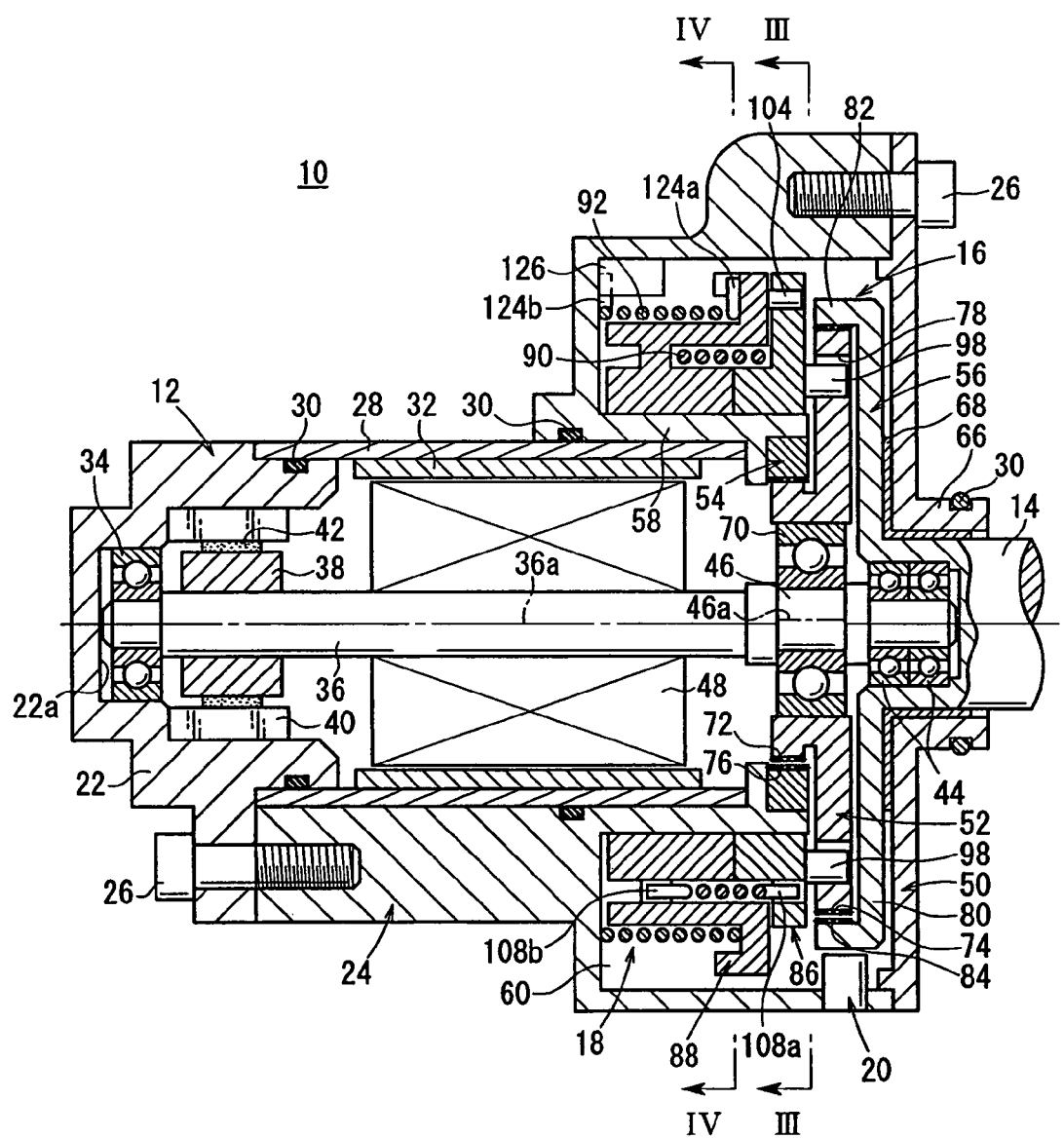
FIG. 1 is a vertical cross-sectional view of a gear speed reducer according to the present invention.

As shown in FIG. 1, a gear speed reducer 10 according to the present invention comprises an actuator 12 for producing rotational drive power in response to an electric signal supplied thereto, a speed reducer mechanism 16 for transmitting the rotational drive power from the actuator 12 at a certain speed reduction amount to an output shaft 14, a default mechanism (rotation holding mechanism) 18 for holding the output shaft 14 at a predetermined angular displacement or angle when the electric signal supplied to the actuator 12 is interrupted, and a detector 20 for detecting the angular displacement or angle of the output shaft 14 in the speed reducer mechanism 16. The gear speed reducer 10 has a self-lock function for preventing drive power applied from the output shaft 14 from being transmitted to the actuator 12.

The actuator 12 comprises a DC motor, for example, and has a bottomed housing 22 fastened to a body 24 (described later) of the speed reducer mechanism 16 by a bolt 26, and a hollow cylindrical yoke 28 disposed between the housing 22 and the body 24. The housing 22 and the yoke 28 jointly define a space in the actuator 12. The space defined in the actuator 12 by the housing 22 and the yoke 28 is hermetically sealed by an annular seal 30 disposed in an annular groove defined in the outer circumferential surface of the housing 22 which is held against the yoke 28 and another annular seal 30 disposed in an annular groove defined in the inner circumferential surface of the body 24 which is held against the yoke 28.

A hollow cylindrical magnet 32 is mounted on the inner circumferential surface of the yoke 28. The magnet 32 comprises a bonded neodymium magnet, a sintered neodymium magnet, or the like. Since the magnet 32 comprises a neodymium-based magnet, the actuator 12 is small in size and can produce high output power. As the magnet 32 can be magnetized radially and also in the direction of its height, the electromagnetic efficiency of the actuator 12 is increased.

The housing 22 has a mount hole 22a defined in its axial bottom which is concave in a direction away from the speed reducer mechanism 16. A rotational shaft or drive shaft 36 which is disposed coaxially in the housing 22 and the yoke 28 has an end rotatably supported by a bearing 34 that is placed in the mount hole 22a.

The actuator 12 has a commutator 38 mounted on an end portion of the rotational shaft 36 close to the bearing 34, to rotate integrally with the rotational shaft 36. An annular brush holder 40 is mounted on the inner circumferential surface of the housing 22 which faces the commutator 38. The annular brush holder 40 holds brushes 42 projecting radially inwardly from the inner circumferential surface of the annular brush holder 40 and held in contact with the outer circumferential surface of the commutator 38.

The rotational shaft 36 is axially elongate and has the other end rotatably supported by a pair of bearings 44 mounted in a second gear 56, to be described later, of the speed reducer mechanism 16. Therefore, the opposite ends of the rotational shaft 36 are rotatably supported respectively by the bearing 34 mounted in the housing 22 and the bearings 44 mounted in the second gear 56.

The rotational shaft 36 has an offset portion 46 near the end thereof that is supported by the bearings 44, the offset portion 46 having an axis 46a that is offset radially outwardly a predetermined distance from the axis 36a of the rotational shaft 36. The speed reducer mechanism 16 has a first gear 52, to be described later, rotatably supported on the offset portion 46 by a gearing 70.

The actuator 12 also has a tubular armature 48 integrally mounted substantially centrally on the rotational shaft 36. The tubular armature 48 has an outer circumferential surface radially inwardly spaced a small clearance from the magnet 32 that is disposed around the tubular armature 48.

In the illustrated embodiment, the actuator 12 comprises a DC motor. However, the actuator 12 may comprise an SR motor, a brushless motor, or the like.

Figure 2:
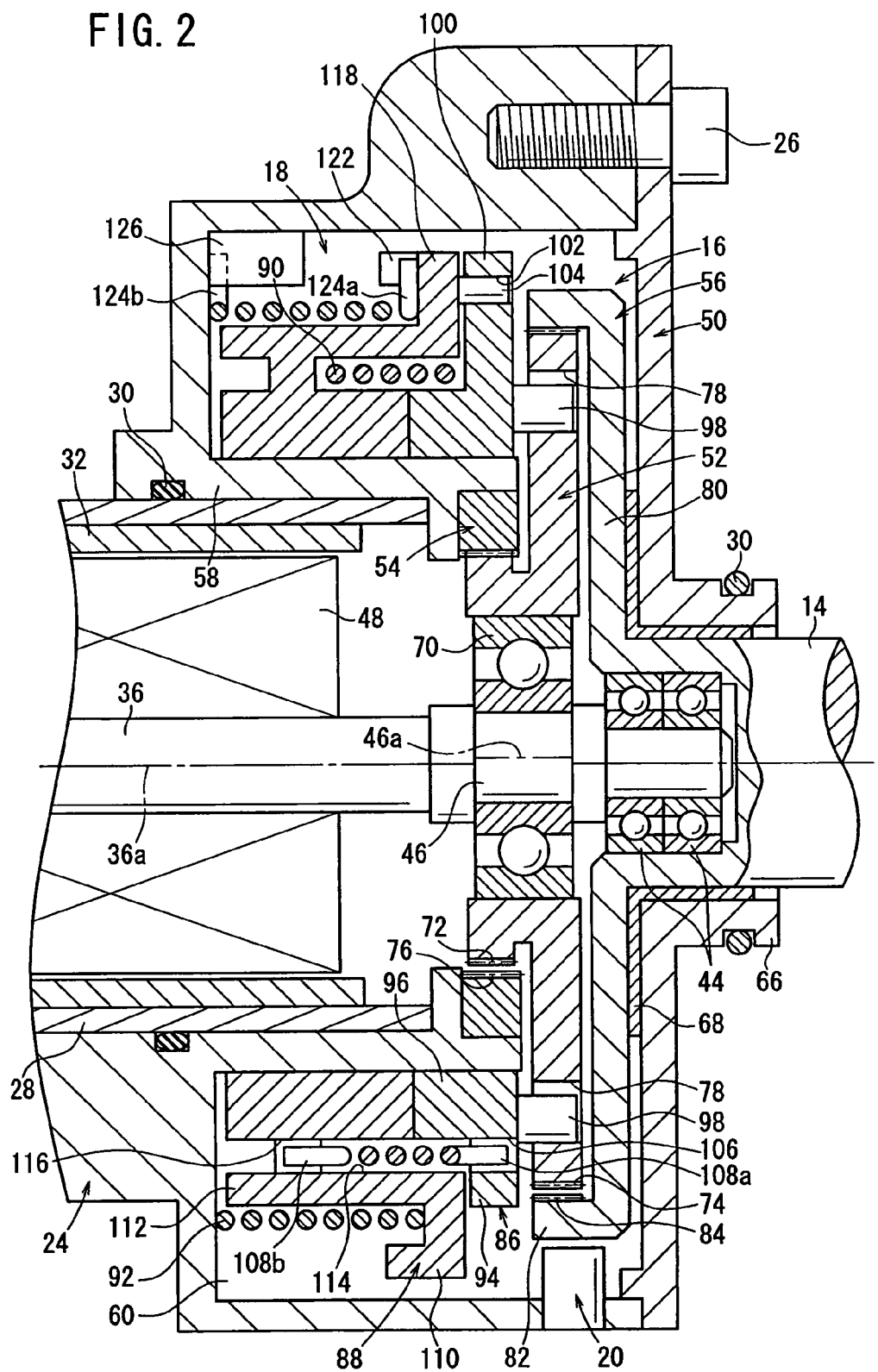
FIG. 2 is an enlarged fragmentary vertical cross-sectional view of a speed reducer mechanism of the gear speed reducer shown in FIG. 1.

As shown in FIG. 2, the speed reducer mechanism 16 comprises the body 24 coupled to the housing 22 of the actuator 12, a disk-shaped cover plate 50 closing an open end of the body 24, the first gear 52 mounted on the offset portion 46 of the rotational shaft 36, a fixed gear 54 fixed to the body 24 in a radially confronting relation to an outer circumferential surface of the first gear 52, and the second gear 56 held in mesh with the first gear 52 for transmitting the rotational drive power from the actuator 12 through the output shaft 14 to an external mechanism.

The yoke 28 of the actuator 12 is inserted into one end of the body 24, after which the housing 22 is fastened to the end of the body 24 by the bolt 26. The other end of the body 24 extends radially outwardly to a diameter greater than the diameter of the one end of the body 24. The body 24 has a cylindrical wall 58 disposed in the other end thereof and having an inner circumferential surface whose diameter remains substantially the same in the axial direction thereof. The other end of the body 24 has a space 60 defined therein around the cylindrical wall 58. The space 60 accommodates therein the first gear 52, the second gear 56, and the default mechanism 18.

Figure 3:
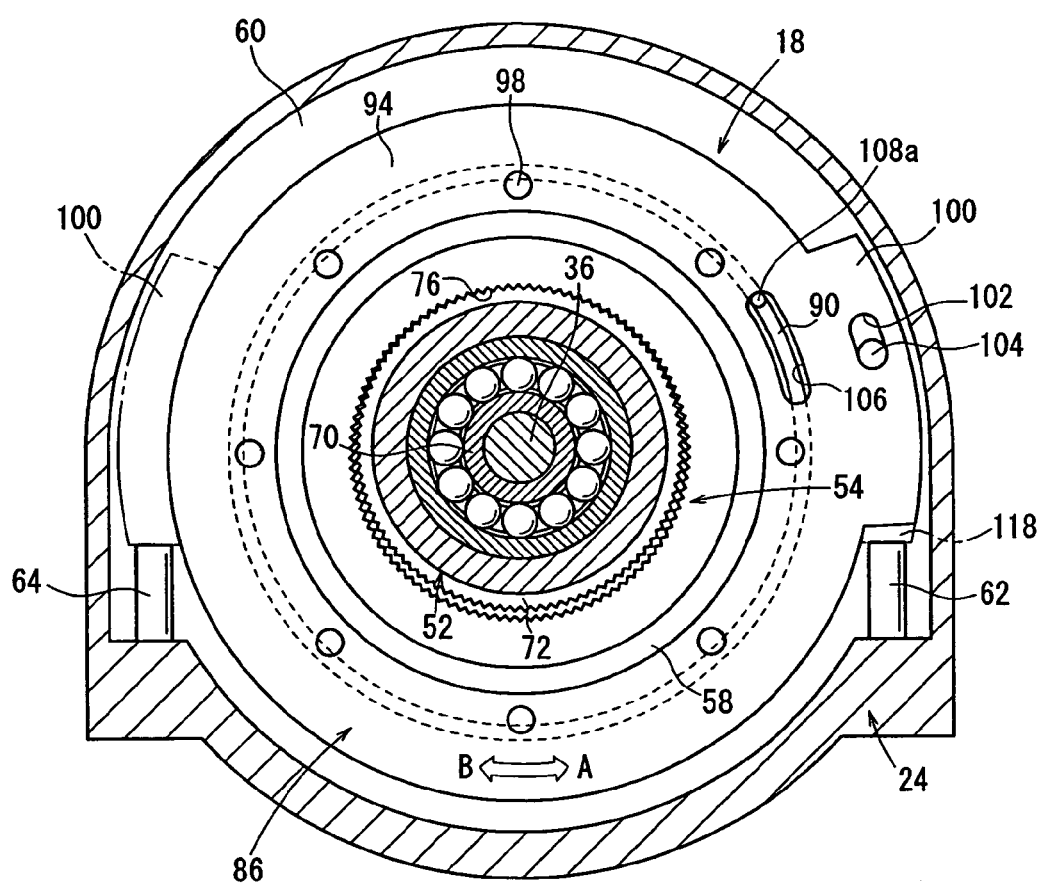
FIG. 3 is a vertical cross-sectional view taken along line III-III of FIG. 1.

As shown in FIG. 3, the body 24 houses therein first and second stoppers 62, 64 for limiting angular displacement of a first rotary disk 86, to be described later, of the default mechanism 18 and also limiting rotational drive power from the second gear 56.

The first and second stoppers 62, 64, each in the form of a rod, project from the bottom of the body 24 into the space 60 by respective predetermined distances which are substantially equal to each other. The first and second stoppers 62, 64 are positioned substantially symmetrically with respect to the central axis of the body 24 and disposed radially outwardly of the outer circumferential surface of the first rotary disk 86. The distances by which the first and second stoppers 62, 64 project from the bottom of the body 24 into the space 60 may be adjusted by an adjusting mechanism (not shown).

The first and second stoppers 62, 64 are illustrated as being separate from the body 24. However, the first and second stoppers 62, 64 may be integral with the body 24.

As shown in FIGS. 1 and 2, the cover plate 50 has a shaft holder sleeve 66 projecting from a substantially central area thereof a predetermined distance away from the body 24. The output shaft 14, which is integral with the second gear 56, is rotatably held in the shaft holder sleeve 66 with a sliding member 68 such as a bushing or the like interposed therebetween. An annular seal 30 is mounted in an annular groove defined in the outer circumferential surface of the shaft holder sleeve 66.

The first gear 52 is in the form of a disk and includes a small-diameter gear 72 positioned closer to the actuator 12 and held in mesh with the fixed gear 54 and a large-diameter gear 74 extending radially outwardly of the small-diameter gear 72 and held in mesh with the second gear 56. The large-diameter gear 74 is disposed adjacent to the small-diameter gear 72 closer to the cover plate 50.

The fixed gear 54 has first internal teeth 76 held in mesh with the small-diameter gear 72. As shown in FIG. 3, the first internal teeth 76 and the small-diameter gear 72 are in the form of cycloidal gears. Only a circumferential portion of the small-diameter gear 72 is held in mesh with some of the first internal teeth 76 at all times, and the meshing portion moves circumferentially along the first internal teeth 76 as the small-diameter gear 72 rotates.

Figure 5:
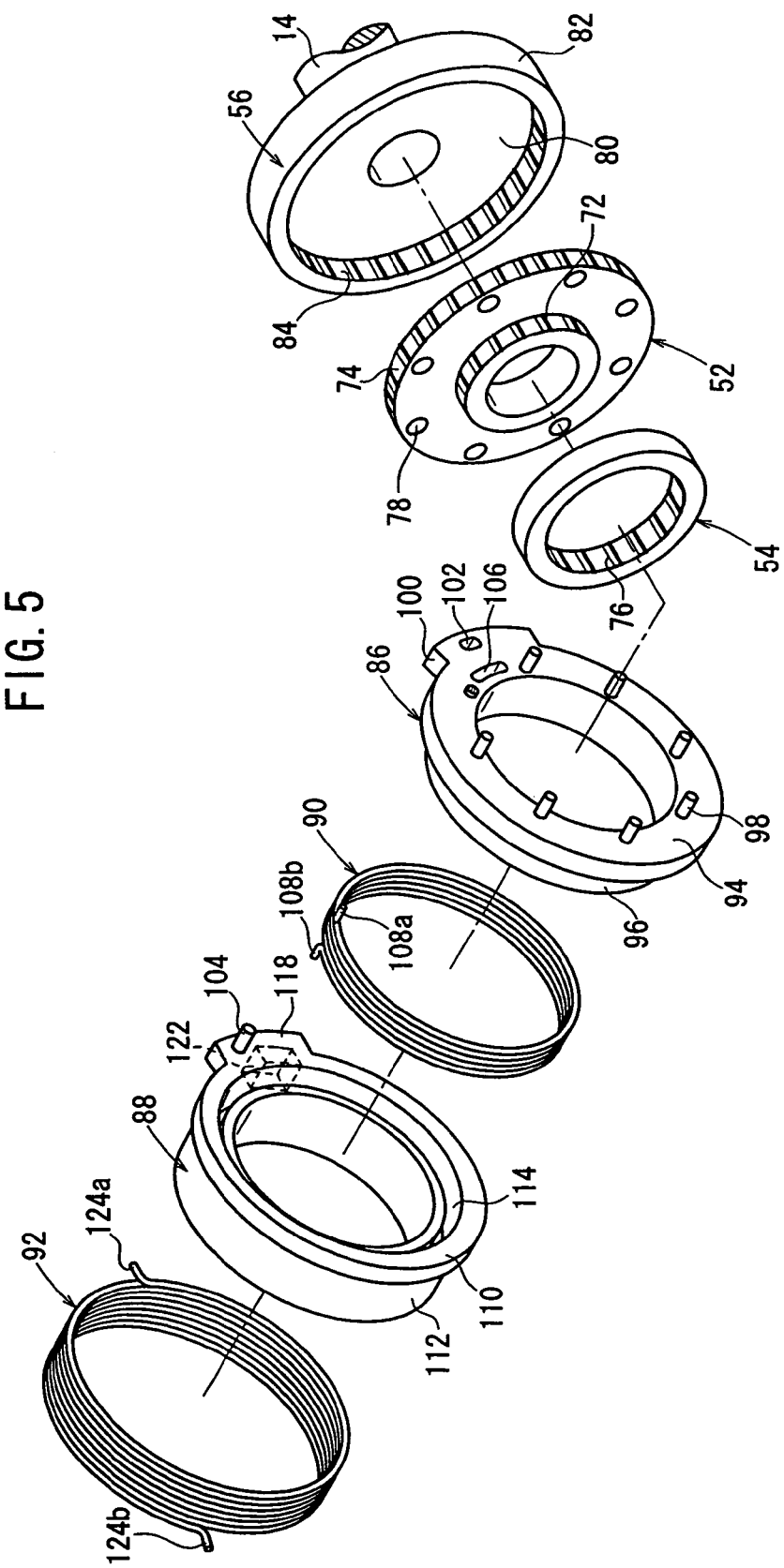
FIG. 5 is an exploded perspective view of the speed reducer mechanism and a default mechanism of the gear speed reducer shown in FIG. 1.

As shown in FIG. 5, the large-diameter gear 74 has a plurality of, e.g., eight joint holes 78 defined therein at circumferentially equal angular intervals. The joint holes 78 are positioned at the same radius from the center of the first gear 52, and extend axially through the first gear 52.

As shown in FIGS. 1 and 2, the second gear 56 comprises the output shaft 14 which extends axially through the shaft holder sleeve 66 of the cover plate 50, a large-diameter portion 80 extending radially outwardly from the output shaft 14, a flange 82 bent at a substantially right angle from the outer circumferential edge of the large-diameter portion 80 toward the actuator 12, and second internal teeth 84 disposed in the inner circumferential surface of the flange 82.

Figure 6:
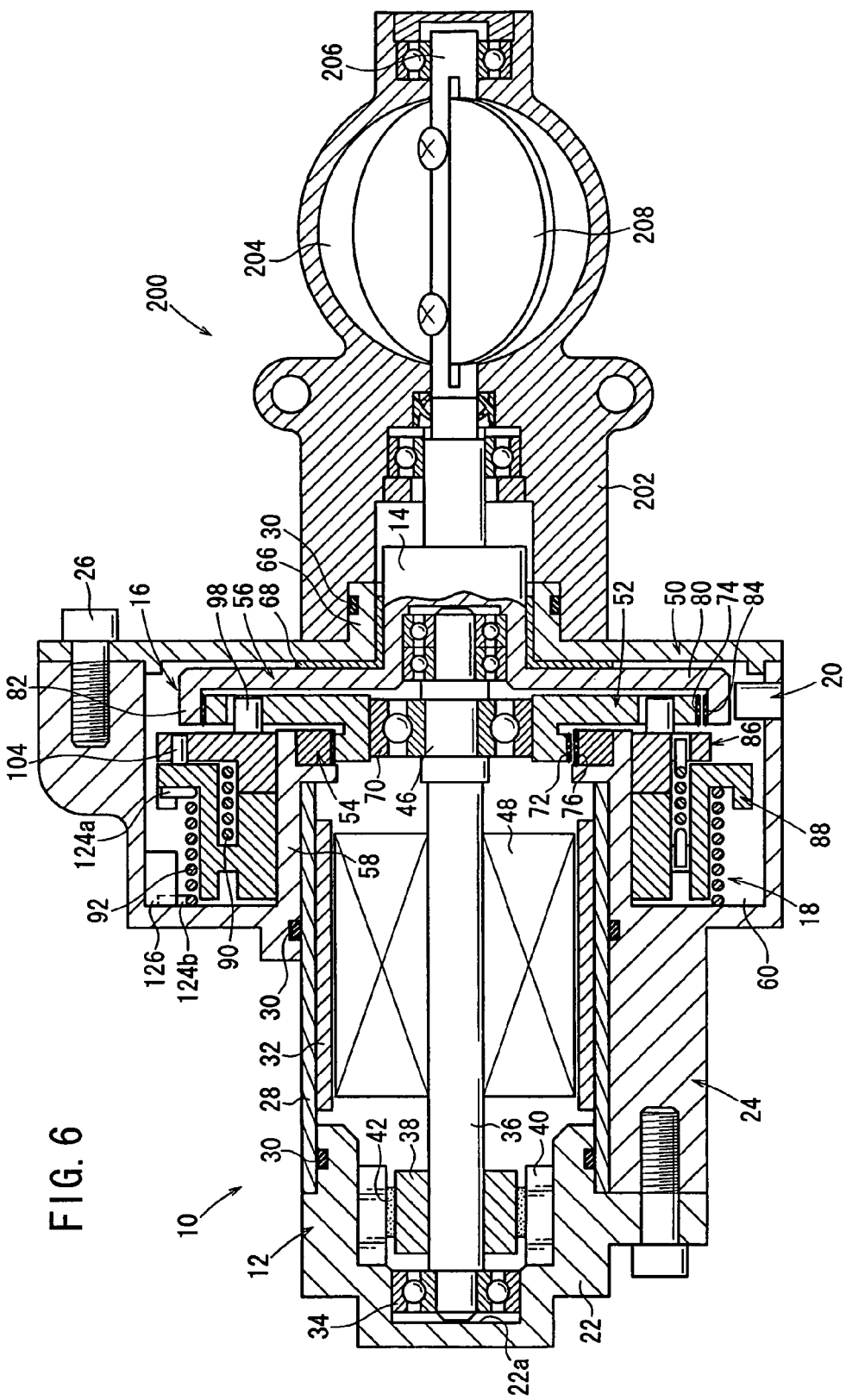
FIG. 6 is a vertical cross-sectional view showing a combination of the gear speed reducer shown in FIG. 1 and a throttle valve.

As described above, the output shaft 14 is rotatably held in the shaft holder sleeve 66 with the sliding member 68 such as a bushing or the like interposed therebetween. The output shaft 14 projects a predetermined distance axially from the outer end of the shaft holder sleeve 66. The bearings 44 which are axially juxtaposed are disposed in the output shaft 14 and hold the other end of the rotational shaft 36. As shown in FIG. 6, a valve shaft 206 of a throttle valve 200 which is coupled to the intake manifold of an internal combustion engine, not shown, is connected coaxially to the output shaft 14. When the output shaft 14 is rotated, it turns the valve shaft 206 through a certain angle to cause a valve body 208 joined to the valve shaft 206 to control the rate of intake air that flows through an intake passage 204 in the valve body 208.

The large-diameter portion 80 of the second gear 56 extends substantially parallel to the cover plate 50, and the flange 82 extends substantially parallel to the axis of the output shaft 14. The flange 82 extends to a position radially facing the outer circumferential surface of the large-diameter gear 74 of the first gear 52. The large-diameter gear 74 is held in mesh with the second internal teeth 84 of the flange 82.

The large-diameter gear 74 of the first gear 52 and the second internal teeth 84 of the second gear 56 which is in mesh with the large-diameter gear 74 are in the form of cycloidal gears. Only a circumferential portion of the large-diameter gear 74 is held in mesh with some of the second internal teeth 84 at all times, and the meshing portion moves circumferentially along the second internal teeth 84 as the large-diameter gear 74 rotates.

In the speed reducer mechanism 16, when the actuator 12 is energized, it applies rotational drive power to rotate the rotational shaft 36 supported by the bearings 34, 44, causing the small-diameter gear 72 of the first gear 52 on the offset portion 46 of the rotational shaft 36 to rotate while moving along the inner circumferential surface of the fixed gear 54 in mesh with the first internal teeth 76 of the fixed gear 54. The second gear 56 that is held in mesh with the large-diameter gear 74 of the first gear 52 rotates in mesh with the first gear 52. Therefore, the rotational drive power from the actuator 12 is reduced by the first and second gears 52, 56 and transmitted through the output shaft 14 to the throttle valve 200. Specifically, the rotational drive power from the actuator 12 is reduced and transmitted at a combination of respective two stages provided by the first and second gears 52, 56.

As shown in FIG. 2, the default mechanism 18, which is disposed in the space 60 in the body 24, comprises the first rotary disk 86 that is coupled to the first gear 52 of the speed reducer mechanism 16 for rotation in unison with the first gear 52, a second rotary disk 88 disposed closer to the actuator 12 than the first rotary disk 86 and held in engagement with the first rotary disk 86, a first spring 90 disposed on an outer circumferential surface of the first rotary disk 86, and a second spring 92 disposed around the second rotary disk 88.

The first rotary disk 86 comprises a first large-diameter portion 94 mounted on the outer circumferential surface of the cylindrical wall 58 of the body 24 and facing a side surface of the first gear 52, and a first small-diameter portion 96 disposed closer to the actuator 12 than the first large-diameter portion 94 and having a diameter smaller than the first large-diameter portion 94.

As shown in FIG. 5, the first large-diameter portion 94 has a plurality of, e.g., eight joint pins 98 mounted on a side surface thereof facing the first gear 52 at circumferentially equal angular intervals. The joint pins 98 are inserted respectively in the joint holes 78 defined in the first gear 52. The joint holes 78 are larger in diameter than the joint pins 98. Consequently, the first rotary disk 86 is coupled to the first gear 52 so that the first rotary disk 86 is displaceable in the radial directions of the joint holes 78 by a clearance that is provided around the joint pins 98 in the joint holes 78.

As shown FIG. 3, a first lever 100 projects radially outwardly from the outer circumferential surface of the first large-diameter portion 94. The first lever 100 has a predetermined width in the circumferential direction of the first large-diameter portion 94. The first lever 100 has a first engaging hole 102 defined therein which extends a predetermined distance in the circumferential direction of the first large-diameter portion 94. The first engaging hole 102 is in the shape of an elongate hole which receives therein an engaging pin 104, to be described later, that is defined in the second rotary disk 88.

When the first rotary disk 86 is angularly displaced clockwise in the direction indicated by the arrow B upon rotation of the first gear 52, an end face of the first lever 100 abuts against and is engaged by an end face of the first stopper 62 on the body 24. The first stopper 62 therefore limits the first rotary disk 86 against further clockwise angular displacement in the direction indicated by the arrow B.

When the first rotary disk 86 is angularly displaced counterclockwise in the direction indicated by the arrow A, which is opposite to the direction indicated by the arrow B, upon rotation of the first gear 52, the other end face of the first lever 100 abuts against and is engaged by an end face of the second stopper 64 on the body 24. The second stopper 64 therefore limits the first rotary disk 86 against further counterclockwise angular displacement in the direction indicated by the arrow A.

Accordingly, the first rotary disk 86 is angularly movable only in an angular range defined between the position where the end face of the first lever 100 abuts against the first stopper 62 and the position where the other end face of the first lever 100 abuts against the second stopper 64.

The first large-diameter portion 94 has an elongate second engaging hole 106 defined between adjacent two of the joint pins 98 in the circumferential direction. The second engaging hole 106 is positioned slightly radially outwardly of the circle on which the joint pins 98 are located. The second engaging hole 106 extends a predetermined distance in the circumferential direction of the first large-diameter portion 94. The first spring 90 has an engaging end 108a inserted in the second engaging hole 106. The first spring 90 is of a helically coiled tubular form disposed around the first small-diameter portion 96 of the first rotary disk 86 (see FIG. 2).

The second rotary disk 88, which is disposed closer to the actuator 12 than the first rotary disk 86, is mounted on the cylindrical wall 58 of the body 24. The second rotary disk 88 comprises a second large-diameter portion 110 axially facing the first large-diameter portion 94 of the first rotary disk 86, a second small-diameter portion 112 disposed closer to the actuator 12 than the second large-diameter portion 110 and having a diameter smaller than the second large-diameter portion 110, and an annular spring insertion slot 114 defined in the second small-diameter portion 112.

The annular spring insertion slot 114 has a diameter smaller than the outer circumferential surface of the second small-diameter portion 112. The annular spring insertion slot 114 has an inner circumferential surface having substantially the same diameter as the outer circumferential surface of the first small-diameter portion 96 of the first rotary disk 86. The first spring 90 that is disposed around the first small-diameter portion 96 of the first rotary disk 86 is positioned on the first small-diameter portion 96 and in the spring insertion slot 114. The first spring 90 has the other engaging end 108b engaging in an engaging groove 116 defined in the second small-diameter portion 112 in communication with the spring insertion slot 114.

The first spring 90 is preloaded with the engaging end 108a thereof engaging the first rotary disk 86 and the other engaging end 108b thereof engaging the second rotary disk 88. Consequently, the first rotary disk 86 and the second rotary disk 88 are normally biased to turn in opposite directions, respectively, under the resilient forces of the first spring 90. Specifically, under the resilient forces of the first spring 90, the first rotary disk 86 is normally biased to turn counterclockwise in the direction indicated by the arrow A, and the second rotary disk 88 is normally biased to turn clockwise in the direction indicated by the arrow B.

Figure 4:
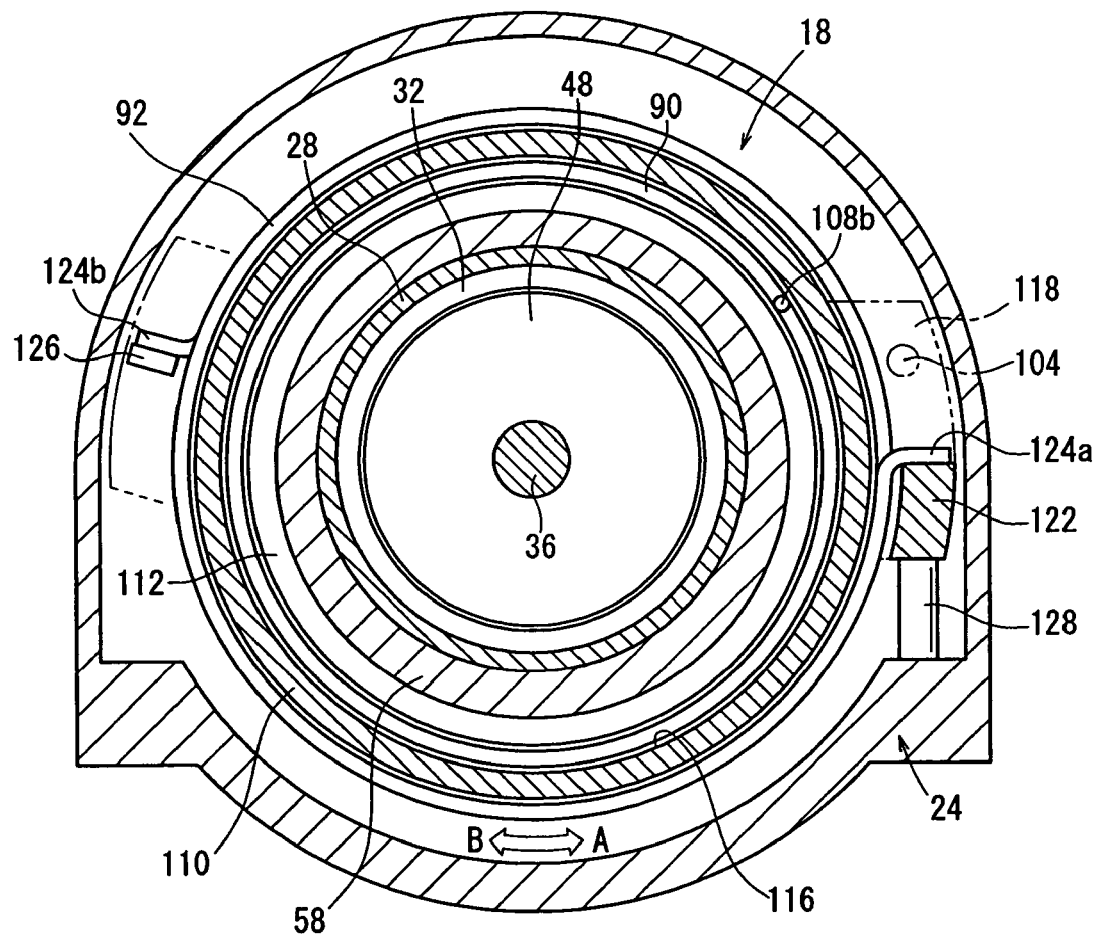
FIG. 4 is a vertical cross-sectional view taken along line IV-IV of FIG. 1.

As shown in FIGS. 4 and 5, a second lever 118 projects radially outwardly from the outer circumferential surface of the second large-diameter portion 110. The second lever 118 has a predetermined width in the circumferential direction of the second large-diameter portion 110. The engaging pin 104 projects from the second lever 118 axially toward the first rotary disk 86. When the second large-diameter portion 110 of the second rotary disk 88 is assembled in abutment against the first large-diameter portion 94 of the first rotary disk 86, the engaging pin 104 is inserted in the first engaging hole 102 defined in the first lever 100 of the first rotary disk 86. The second rotary disk 88 thus engages the first rotary disk 86 so as to be circumferentially displaceable with respect to the first rotary disk 86 through the engaging pin 104 that is movable in and along the first engaging hole 102.

The second lever 118 has an engaging step 122 projecting toward the actuator 12. The second spring 92 has an engaging end 124a engaging the engaging step 122 and the other engaging end 124b engaging an engaging member 126 on a side wall of the body 24 which confronts the second spring 92. The second spring 92 is preloaded to turn the second rotary disk 88 clockwise in the direction indicated by the arrow B.

When the second rotary disk 88 is turned in unison with the first rotary disk 86 upon rotation of the first rotary disk 86, an end face of the second lever 118 abuts against and is engaged by an end face of a default stopper 128 (see FIG. 4) in the body 24. Therefore, the clockwise angular displacement of the second rotary disk 88 in the direction indicated by the arrow B is limited by the default stopper 128. The default stopper 128 extends substantially parallel to the first stopper 62 in the body 24. The end face of the default stopper 128 and the end face of the first stopper 62 have substantially the same height from the surface of the body 24 on which the default stopper 128 and the first stopper 62 are mounted.

As shown in FIGS. 1 and 2, the detector 20 comprises a rotational angle sensor positioned in radial alignment with the outer circumferential surface of the flange 82 of the second gear 56. The detector 20 detects the rotational angle, or angular displacement, of the second gear 56, and the rotational drive power from the actuator 12 is reduced in speed based on the detected angular displacement, i.e., rotational speed, of the second gear 56, and the speed reduction in the rotational drive power transmitted to the second gear 56 is confirmed. The rotational angle sensor used as the detector 20 may comprise an optical sensor having a light-emitting element and a light-detecting element for detecting light emitted from the light-emitting element, a Hall sensor having a Hall device as a magnetic sensor, or a magnetoresistive (MR) sensor having an MR device.

The self-lock function of the gear speed reducer 10 will be described below.

The gear speed reducer 10 is arranged to output the rotational drive power from the actuator 12 through the speed reducer mechanism 16 to the output shaft 14. Occasionally, drive power may be applied from the output shaft 14 of the second gear 56 toward the actuator 12. If drive power is applied from the output shaft 14 to the actuator 12, then the driven member, e.g., the valve shaft 206 of the throttle valve 200, connected to the output shaft 14 may not be fixed in position. The self-lock function of the speed reducer mechanism 16 is effective to prevent drive power from the output shaft 14 from being transmitted from the second gear 56 through the first gear 52 to the actuator 12.

When the rotational shaft 36 is stopped against rotation and external drive power is applied to the output shaft 14 of the second gear 56, a combination of a line of force acting on the mesh between the small-diameter gear 72 of the first gear 52 and the first internal teeth 76 of the fixed gear 54 about the axis 46a of the offset portion 46 and a line of force acting on the mesh between the large-diameter gear 74 of the first gear 52 and the second internal teeth 84 of the second gear 56 about the axis 46a of the offset portion 46 is directed toward the center of the rotational shaft 36.

Therefore, when external drive power is applied from the valve shaft 206 of the throttle valve 200, for example, to the output shaft 14 of the second gear 56, rotational drive power cannot be applied to the offset portion 46 supporting the first gear 52 thereon by the external drive power. Accordingly, the gear speed reducer 10 is locked to prevent the external drive power from being transmitted to the actuator 12.

For example, as shown in FIG. 6, if the gear speed reducer 10 according to the embodiment of the present invention is combined with the throttle valve 200 with the valve shaft 206 connected to the output shaft 14 of the speed reducer mechanism 16, intake air flowing through the intake passage 204 is unable to angularly displace the valve shaft 206 through the valve body 208. Therefore, after the valve body 208 has been angularly displaced a certain angle, the opening of the valve body 208 remains unchanged under the pressure of the intake air flowing through the intake passage 204. Even when no rotational drive power is applied from the actuator 12 to the output shaft 14 and hence the valve shaft 206, the opening of the valve body 208 is maintained.

If the gear speed reducer 10 does not have the self-lock function, the speed reducer mechanism 16 may have a single gear stage, rather than the two gear stages as illustrated.

The gear speed reducer 10 according to the present invention is basically constructed as described above. Operation and advantages of the gear speed reducer 10 will be described below. It is assumed that the speed reducer mechanism 16 is in an initial position when the first lever 100 of the first rotary disk 86 is held in abutment against the first stopper 62 under the resiliency of the second spring 92, as shown in FIG. 3, the number of the teeth of the small-diameter gear 72 is represented by n1, the number of the teeth of the large-diameter gear 74 by n2, the number of the first internal teeth 76 of the fixed gear 54 by n3, and the number of the second internal teeth 84 of the second gear 56 by n4.

When the actuator 12 is supplied with a current from a power supply, not shown, the actuator 12 is energized to rotate the rotational shaft 36 counterclockwise in the direction indicated by the arrow A, causing the offset portion 46 to angularly displace the first gear 52 along the first internal teeth 76 of the fixed gear 54. At this time, the first rotary disk 86 that is coupled to the first gear 52 through the joint pins 98 received in the respective joint holes 78 is turned in unison with the first gear 52 against the bias of the second spring 92, and the second rotary disk 88 is angularly displaced in unison with the first rotary disk 86 counterclockwise in the direction indicated by the arrow A.

The rotational drive power that is transmitted from the rotational shaft 36 to the first gear 52 is reduced in speed under the meshing action of the small-diameter gear 72 of the first gear 52 and the first internal teeth 76 of the fixed gear 54 at a speed reduction ratio n1/n3, which is produced by dividing the number n1 of the teeth of the small-diameter gear 72 by the number n3 of the first internal teeth 76. Then, the rotational drive power is transmitted from the first gear 52 to the second gear 56 that is held in mesh with the large-diameter gear 74.

The rotational drive power is transmitted from the first gear 52 to the second gear 56 is reduced in speed under the meshing action of the large-diameter gear 74 of the first gear 52 and the second internal teeth 84 of the second gear 56 at a speed reduction ratio n2/n4, which is produced by dividing the number n2 of teeth of the large-diameter gear 74 by the number n4 of the second internal teeth 84. Then, the rotational drive power is transmitted from the second gear 56 through the output shaft 14 to the throttle valve 200. Since the rotational drive power transmitted to the first gear 52 is reduced in speed by the fixed gear 54, the rotational drive power transmitted to the second gear 56 is output from the output shaft 14 at a speed reduction ratio n3×n2/(n1×n4) with respect to the rotational drive power applied from the actuator 12 to the rotational shaft 36. Stated otherwise, the rotational drive power that is output from the output shaft 14 is reduced in speed to $1/\{n3 \times n2/(n1 \times n4)\}$ from the rotational drive power from the rotational shaft 36.

When the end face of the first lever 100 of the first rotary disk 86 abuts against the second stopper 64, the angular displacement of the first rotary disk 86 is limited. The second rotary disk 88 and the first and second gears 52, 56 are now stopped against rotation, thereby stopping outputting the rotational drive power from the output shaft 14.

As described above, when the rotational drive power from the actuator 12 overcomes the resilient force of the second spring 92, the first rotary disk 86 and the first and second gears 52, 56 are angularly displaced in unison with the second rotary disk 88 which is engaged by the engaging end 124a of the second spring 92.

For returning the speed reducer mechanism 16 from a terminal position in which the first rotary disk 86 abuts against the second stopper 64 to the initial position, the current that has been supplied to the actuator 12 is interrupted. The second rotary disk 88 is angularly displaced back clockwise in the direction indicated by the arrow B under the bias of the second spring 92, and the first rotary disk 86 and the first and second gears 52, 56 are angularly displaced in unison with the second rotary disk 88 clockwise in the direction indicated by the arrow B.

When the end face of the second lever 118 of the second rotary disk 88 abuts against the end face of the default stopper 128, the clockwise angular displacement of the second rotary disk 88 in the direction indicated by the arrow B is limited. At the same time, the actuator 12 is energized with a current that is reversed in polarity to rotate the rotational shaft 36 clockwise in the direction indicated by the arrow B, applying the rotational drive power thereof through the first gear 52 to the first and second rotary disks 86, 88.

The first rotary disk 86 is now angularly displaced clockwise in the direction indicated by the arrow B against the bias of the first spring 90 until the other end face of the first lever 100 of the first rotary disk 86 abuts against the end face of the first stopper 62. As a result, the clockwise angular displacement of the first rotary disk 86 in the direction indicated by the arrow B is limited. The first and second rotary disks 86, 88 are now returned from the terminal position in which the first rotary disk 86 is engaged by the second stopper 64 to the initial position under the resilient force of the second spring 92 and the rotational drive power from the actuator 12.

At this time, to keep the first rotary disk 86 engaged by the first stopper 62, the rotational drive power from the actuator 12 is continuously applied to the first rotary disk 86 to overcome the resiliency of the first spring 90.

If the actuator 12 is de-energized in the initial position in which the first rotary disk 86 is engaged by the first stopper 62, then the rotational drive power that has been applied to the first rotary disk 86 to turn it clockwise in the direction indicated by the arrow B is interrupted. Therefore, the first rotary disk 86 is slightly angularly displaced counterclockwise in the direction indicated by the arrow A under the resiliency of the first spring 90 that engages in the second engaging hole 106 (see FIG. 3). After the first rotary disk 86 is angularly displaced an interval corresponding to the circumferential length of the first engaging hole 102 by the engaging pin 104 inserted in the first engaging hole 102, the engaging pin 104 engages an end of the first engaging hole 102, whereupon the first rotary disk 86 stops from being angularly displaced.

In this manner, the second gear 56 is slightly angularly displaced counterclockwise in the direction indicated by the arrow A by the first gear 52 that is coupled to the first rotary disk 86 by the joint pins 98. Therefore, the second gear 56 which has the output shaft 14 is kept angularly displaced by the default mechanism 18 counterclockwise in the direction indicated by the arrow A by a predetermined interval from the initial position in which the first gear 52 is engaged by the first stopper 62.

The angular displacement of the first rotary disk 86 can be changed by changing the circumferential length of the second engaging hole 106. Consequently, the counterclockwise angular displacement of the output shaft 14 can be adjusted to a desired value.

According to the present invention, as described above, since the large-diameter gear 74 and the small-diameter gear 72 of the first gear 52, the first internal teeth 76 of the fixed gear 54, and the second internal teeth 84 of the second gear 56 are in the form of cycloidal gears, the meshing ratio between the small-diameter gear 72 and the first internal teeth 76 and the meshing ratio between the large-diameter gear 74 and the second internal teeth 84 are increased. Therefore, the rotational drive power from the actuator 12 can efficiently be reduced in speed by the first and second gears 52, 56 and output from the output shaft 14. As the cycloidal gears are highly durable, the speed reducer mechanism 16 is of a longer service life.

Because the first and second gears 52, 56 of the speed reducer mechanism 16 are disposed substantially coaxially with the rotational shaft 36 to which the rotational drive power from the actuator 12 is applied, the radial size of the speed reducer mechanism 16 is not unduly increased even if the speed reduction ratio of the speed reducer mechanism 16 is set to a large value. As a result, the gear speed reducer 10 according to the present invention is relatively small in size compared with conventional gear speed reducers which employ spur gears or worm gears.

The gear speed reducer 10 according to the present invention as combined with the throttle valve (throttle opening adjuster) 200 mounted on the intake manifold of the engine will be described below.

As shown in FIG. 6, the throttle valve 200 has the intake passage 204 defined in a valve body 202 for passing therethrough intake air from the intake manifold, not shown, and the valve shaft 206 extends through the intake passage 204 and is rotatably supported in the valve body 202. The disk-shaped valve body 208 is mounted on the valve shaft 206. When the valve shaft 206 is turned about its axis, the valve body 208 opens and closes the intake passage 204 to control the rate of intake air flowing through the intake passage 204.

The shaft holder sleeve 66 of the body 24 is inserted into an end of the valve body 202, and the output shaft 14 of the second gear 56 is coupled to the valve shaft 206. After the rotational drive power from the actuator 12 is reduced in speed by the first and second gears 52, 56, the rotational drive power is transmitted from the output shaft 14 to the valve shaft 206, which is rotated to cause the valve body 208 to open or close the intake passage 204.

When the first lever 100 of the first rotary disk 86 is brought into abutment against the second stopper 64 by the rotational drive power transmitted from the actuator 12, the throttle valve 200 is fully opened. Conversely, when the second rotary disk 88 is brought into abutment against the default stopper 128 under the resiliency of the second spring 92 and the first rotary disk 86 is brought into abutment against the first stopper 62, the throttle valve 200 is fully closed.

In the throttle valve 200 fully opened or closed as described above, when the actuator 12 is de-energized, the first rotary disk 86 can be slightly angularly displaced in the fully valve opening direction indicated by the arrow A by the default mechanism 18. Stated otherwise, the output shaft 14 of the second gear 56 can be held in an intermediate angular position between the initial position in which the first rotary disk 86 is held in abutment against the first stopper 62 and the terminal position in which the first rotary disk 86 abuts against the second stopper 64. When the second gear 56 is slightly angularly displaced by the first gear 52 which is coupled to the first rotary disk 86 by the joint pins 98, the intake passage 204 which has been closed by the valve body 208 mounted on the valve shaft 206 is slightly opened, allowing a slight amount of intake air to flow through the intake passage 204.

Since the gear speed reducer 10 combined with the throttle valve 200 has the default mechanism 18, even when the actuator 12 is de-energized for some reason, intake air can be supplied uninterruptedly through the throttle valve 200 to the engine.

The pressure of intake air flowing through the intake passage 204 tends to apply drive power through the valve shaft 206 to the output shaft 14 of the gear speed reducer 10. However, the self-lock function of the gear speed reducer 10 prevents the drive power from the valve shaft 206 from being transmitted to the actuator 12. Therefore, no drive power is applied from the throttle valve 200 to the actuator 12. Furthermore, since the output shaft 14 is not angularly displaced, the valve shaft 206 connected to the output shaft 14 is also prevented from being angularly displaced.

Although a certain preferred embodiment of the present invention has been shown and described in detail, it should be understood that various changes and modifications may be made therein without departing from the scope of the appended claims.

What is claimed is:

1. A gear speed reducer comprising:
    an actuator for producing rotational drive power in response to an electric signal supplied thereto;
    a drive shaft rotatable by the rotational drive power produced by said actuator;
    a speed reducer mechanism for transmitting the rotational drive power from said drive shaft and having cycloidal gears for reducing speed of the rotational drive power;
    an output shaft disposed coaxially with said drive shaft, for outputting the rotational drive power whose speed is reduced by said speed reducer mechanism; and
    a rotation holding mechanism for limiting angular displacement of said output shaft which has been angularly displaced a predetermined angle, between an initial position and a terminal position when the electric signal supplied to said actuator is interrupted, wherein said rotation holding mechanism comprises:
    an engaging hole in a shape of an elongate hole formed along a circumferential direction of said rotation holding mechanism;
    an engaging pin inserted in said engaging hole;
    a first rotary disk coupled to said speed reducer mechanism for rotation in unison therewith;
    a second rotary disk disposed adjacent to said first rotary disk and engaging said first rotary disk via said engaging pin; and
    springs for biasing said first rotary disk and said second rotary disk in respective directions to rotate about their axes, and
    wherein said first rotary disk, said second rotary disk and said springs are disposed coaxially, and
    wherein when said first rotary disk is displaced by a predetermined angle with respect to said second rotary disk under resiliency of one of said springs, relative displacement of said first rotary disk and said second rotary disk in a rotation direction is limited by said engaging pin movable only in and along said engaging hole.

2. A gear speed reducer according to claim 1, wherein said rotation holding mechanism comprises stoppers for limiting angular displacement of said first rotary disk.

3. A gear speed reducer according to claim 1, wherein said rotation holding mechanism comprises a stopper for limiting angular displacement of said second rotary disk in one direction.

4. A gear speed reducer according to claim 1, wherein said first rotary disk has a joint pin projecting toward said speed reducer mechanism, said joint pin engaging in an engaging hole defined in a gear of said speed reducer mechanism.

5. A gear speed reducer according to claim 1, further comprising a detector for detecting an angular displacement of said output shaft in said speed reducer mechanism to detect a speed reduction in the rotational drive power transmitted from said drive shaft through said speed reducer mechanism to said output shaft based on the detected angular displacement.

6. A gear speed reducer according to claim 1, for use with a throttle opening adjuster for adjusting a rate of intake air introduced into an internal combustion engine.

7. A gear speed reducer according to claim 1, wherein said speed reducer mechanism comprises:
   a first gear to which the rotational drive power from said drive shaft is transmitted; and
   a second gear held in mesh with said first gear for reducing speed of the rotational drive power and transmitting the rotational drive power whose speed is reduced to said output shaft;
   said first gear and said second gear comprising said cycloidal gears, respectively.

8. A gear speed reducer according to claim 7, wherein said first gear comprises a small-diameter gear meshing with internal teeth of a fixed gear and a large-diameter gear meshing with internal teeth of said second gear, and wherein said speed reducer mechanism is disposed such that a combination of
   (a) a line of force acting on a mesh between said small-diameter gear and said internal teeth of said fixed gear about an axis of an offset portion of said drive shaft, and
   (b) a line of force acting on a mesh between said large-diameter gear and said internal teeth of said second gear about said axis is directed toward a center of said rotational shaft, to prevent transmission of drive power applied from said output shaft to said drive shaft.

* * * * *